3,190,859
VULCANIZATION OF ELASTOMERS WITH
QUINONE-N-HALOIMIDES
Peter E. Wei and John Rehner, Jr., Westfield, N.J., assignors to Esso Research and Engineering Company, a corporation of Delaware
No Drawing. Filed June 14, 1961, Ser. No. 116,937
10 Claims. (Cl. 260—79.5)

This invention relates to ethylene alpha-olefin copolymers vulcanized by a quinone-N-haloimide.

Elastomeric, substantially amorphous, ethylene-alpha olefin copolymers have become of increasing interest particularly with the introduction of the low pressure processes for their preparation. These materials, being very amorphous, have low tensile strengths and low softening and melting points. The copolymers do not contain sufficient unsaturation or other functional groups so as to be capable of being cured with sulfur and other curing agents. Thus, dibasic acids, glycols, polyols, diamines, amines and metal oxides by themselves as well as other natural and synthetic rubber, e.g., butyl, vulcanizing agents such as quinone dioxime, dinitrosobenzene, sulfur, and organic accelerators such as thiuram derivatives are also ineffective.

It has now surprisingly been found that the copolymers in question can be cured or vulcanized to superior products by treating them with a quinone-N-haloimide. It is surprising to learn this because, as stated previously, most conventional vulcanizing agents are ineffective with these polymers. It is particularly interesting to note that auxiliary vulcanizing aids are not necessary when employing the compounds of this invention.

The quinone-N-haloimides utilized have the formula:

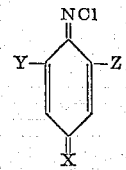

wherein X is selected from the group consisting of O and NCl and Y and Z are selected from the group consisting of H and halogen atoms. Y and Z can be the same or different. In the case of the halogens, bromine and chlorine are preferred. Particularly effective and desirable compounds are: p - benzoquinone-N-chlorimide, 2,6 - dichloro-p-benzoquinone-N-chloroimide, 2,6 - dibromo - p-benzoquinone - N - chloroimide, and p-benzoquinone bis-chloroimide.

The vulcanization of the polymers is effected by thorough contacting of the polymer with the curing agent and fillers, if desired, e.g., on a rubber mill or in a Banbury mixer and subjecting the resulting mixture to temperatures of 200° to 450° F., preferably from 250° to 350° F., and for from 5 to 150 minutes, preferably 10 to 90 minutes.

The quinone-N-haloimide is utilized in an amount of from 0.5 to 15 parts by weight per 100 parts of polymer, preferably between about 1 to 10 parts.

Various metal compounds can additionally be employed in the vulcanization. The metal compounds that can be so used are, e.g., the carbonates, oxides, sulfides, nitrates, phosphates, sulfates, and organic acid salts of zinc and cadmium. Particularly effective are the zinc metal derivatives (Zn stearate, ZnO, ZnS, ZnCO₃). The zinc component of the metal compound appears to be the important consideration with the rest of the molecule being less important. Especially effective and desirable is zinc oxide. The metal compound is utilized in an amount of from 1 to 50 parts by weight per 100 parts of polymer with 1 to 10 parts being preferred.

Fillers are also desirable and a variety of carbon blacks may be used. Best results are obtained with semi-reinforcing or highly reinforcing furnace or channel carbon blacks, such as Pelletex NS, Kosmobile S-66, Philblack A, Philblack O, Spheron 9, etc. The amount of carbon black used can be from 0 part to 150 parts by weight, but more generally 10 to 70 parts per 100 parts of polymer. Clays can also be used. Sulfur may also be used if desired in amounts from 0 to 10 parts by weight, but more generally 0.5 to 5 parts per 100 parts of polymer.

The polymers cured according to this invention are the low pressure elastomers, substantially amorphous (having less than about 5 wt. percent crystallinity) copolymers of ethylene and other alpha olefins. The copolymers thus include $C_3$ to $C_5$ alpha olefins such as propylene, butene-1, and pentene-1. Propylene is particularly preferred as the other alpha olefin.

For the purpose of convenience, details of the low pressure catalytic process and the products obtained thereby are presented below, although it should be realized that these by themselves constitute no part of this invention. The process is generally described in the literature, e.g., see "Scientific American," September 1957, page 98 et seq.

In that process the polymers are prepared by copolymerizing the monomers with the aid of certain polymerization catalysts. The catalysts are solid, insoluble reaction products obtained by partially reducing a heavy metal compound usually the halide of a Group IV–B, V–B and VI–B metal of the Periodic System, such as vanadium tetrachloride, $VOCl_3$ or a titanium halide, e.g., $TiCl_4$, $TiBr_4$, etc. The product is then activated with an aluminum alkyl compound corresponding to the formula RR'AlX. In this formula, R, R' and X preferably are alkyl groups of 2 to 8 carbon atoms, although X may alternatively be hydrogen or halogen, notably chlorine. Typical examples of the aluminum alkyl compounds are aluminum triethyl, aluminum sesquichloride, aluminum triisobutyl, etc.

The monomers are then contacted with the resulting catalyst in the presence of inert hydrocarbon solvents such as isopentane, n-heptane, xylene, etc. The polymerization is conveniently effected at temperatures of about 0° to 100° C. and pressures ranging from about 0 to 500 p.s.i.g., usually 0 to 100 p.s.i.g. The catalyst concentration in the polymerization zone is preferably in the range of about 0.1 to 0.5% based on the total liquid, and the polymer product concentration in the polymerization zone is preferably kept between about 2 to 15% based on total contents, so as to allow easy handling of the polymerization mixture. The proper polymer concentration can be obtained by having enough of the inert diluent present or by stopping the polymerization short of 100% conversion. When the desired degree of polymerization has been reached, a $C_1$ to $C_8$ alkanol such as isopropyl alcohol or n-butyl alcohol, is normally added to the reaction mixture for the purpose of dissolving and deactivating the catalyst and for precipitating the polymer product from solution. After filtration, the solid polymer may be further washed with alcohol or acid such as hydrochloric acid, dried, compacted and packaged.

It is to be understood that the term "low pressure"

polymer as used herein connotes material prepared in the indicated manner.

The ethylene-propylene copolymers in general have a molecular weight of 25,000 to 1,000,000 as determined from viscosity measurements in tetralin solution, according to the method published by G. Moraglio, La Chimica e l'Industria, volume 41, page 984, 1959, and the amount of ethylene in the copolymers can range from 20 to 100 mole percent, but preferably from 30 to 90 mole percent.

The copolymers are further characterized by the following properties: densities ranging from 0.85 to 0.90; percentage by weight insoluble in normal heptane at room temperature, ranging from 10 to 40%; and crystallinity content as determined by X-ray diffraction, ranging from 0 to 15%. The exact values of these physical characteristics depend on the particular composition of the copolymer, and the conditions of synthesis, catalyst used, etc.

This invention and its advantages will be better understood by reference to the following examples.

EXAMPLE 1

An ethylene-propylene copolymer was cured with various quinone-N-haloimides. The details and results are given in the following table:

*Table I*

VULCANIZATION OF ETHYLENE-PROPYLENE COPOLYMERS WITH HALOIMIDES OF BENZOQUINONE

| | 1 | 2 | 3 | 4 | 5 | 6 | 7 | 8 | 9 | 10 | 11 | 12 | 13 |
|---|---|---|---|---|---|---|---|---|---|---|---|---|---|
| Copolymer [1] | | | | 100 | 100 | 100 | 100 | 100 | 100 | 100 | 100 | 100 | 100 |
| Copolymer [2] | 100 | 100 | 100 | | | | | | | | | | |
| Copolymer [3] | | | | | | | | | | | | | |
| Copolymer [4] | | | | | | | | | | | | | |
| Philblack O carbon black | 50 | 50 | 50 | | | | | | | | 50 | 50 | 50 |
| S | 2 | 2 | 2 | | | | | 2 | 2 | 2 | | | |
| ZnO | 5 | 5 | 5 | | | | | 5 | 5 | 5 | | | |
| Calcium stearate | | | | | | | | | | | | | |
| Oil [5] | | | | | | | | | | | | | |
| p-Benzoquinone-N-chloroimide | | | | | 5 | | | 5 | | | 5 | | |
| 2,6-dichloro-p-benzoquinone-N-chloroimide | | 10 | | | | 5 | | | 5 | | | 5 | |
| 2,6-dibromo-p-benzoquinone-N-chloroimide | | | 10 | | | | 5 | | | 5 | | | 5 |
| Cure, °F./minutes: | | | | | | | | | | | | | |
| 280°/15′ Tensile, p.s.i. | | | | | 1,250 | 1,170 | 650 | 1,600 | 1,500 | 1,270 | 1,560 | 1,680 | 1,610 |
| Elongation, percent | | | | | 700 | 780 | 800 | 800 | 680 | 750 | 680 | 400 | 600 |
| 280°/30′ Tensile, p.s.i. | 290 | 1,150 | 1,630 | 320 | 1,550 | 1,500 | 680 | 1,780 | 1,840 | 1,390 | 1,750 | 2,000 | 1,790 |
| Elongation, percent | 260 | 340 | 650 | 700 | 750 | 750 | 750 | 900 | 750 | 700 | 750 | 500 | 720 |
| 300°/30′ Tensile, p.s.i. | | | 1,090 | 350 | | | | | | | | | |
| Elongation, percent | | | 370 | 680 | | | | | | | | | |
| 320°/15′ Tensile, p.s.i. | | | 1,420 | | | | | | | | | | |
| Elongation, percent | | | 680 | | | | | | | | | | |
| 320°/30′ Tensile, p.s.i. | | 1,180 | | 410 | 1,650 | 1,630 | 650 | 1,840 | 1,820 | 1,590 | 1,480 | 1,710 | 1,500 |
| Elongation, percent | | 380 | | 680 | 850 | 780 | 830 | 780 | 600 | 700 | 750 | 700 | 700 |
| 320°/60′ Tensile, p.s.i. | | | 2,000 | | | | | | | | | | |
| Elongation, percent | | | 580 | | | | | | | | | | |
| Extracted vulcanizates: [6] | | | | | | | | | | | | | |
| 280°/30′ Tensile, p.s.i. | | | | | 1,780 | 1,700 | 1,470 | 1,670 | 1,630 | 1,620 | | | |
| Elongation, percent | | | | | 800 | 780 | 780 | 750 | 600 | 700 | | | |

| | 14 | 15 | 16 | 17 | 18 | 19 | 20 | 21 | 22 | 23 | 24 | 25 |
|---|---|---|---|---|---|---|---|---|---|---|---|---|
| Copolymer [1] | 100 | 100 | 100 | 100 | 100 | 100 | | | | | | |
| Copolymer [2] | | | | | | | | | | | | |
| Copolymer [3] | | | | | | | 100 | 100 | | | | |
| Copolymer [4] | | | | | | | | | 100 | 100 | 100 | 100 |
| Philblack O carbon black | 50 | 50 | 50 | 50 | 50 | 50 | 50 | 50 | 50 | 50 | 60 | 60 |
| S | 2 | 2 | 2 | 2 | 2 | 2 | 2 | 2 | 2 | 2 | 2 | 2 |
| ZnO | 5 | 5 | 5 | 5 | 5 | 5 | 5 | 5 | 5 | 5 | 5 | 5 |
| Calcium stearate | | | | | | | | | | | 1 | 1 |
| Oil [5] | | | | | | | | | | | 20 | 40 |
| p-Benzoquinone-N-chloroimide | 5 | | | 10 | | | | | | | 10 | |
| 2,6-dichloro-p-benzoquinone-N-chloroimide | | 5 | | | 10 | | | 5 | | 5 | | 10 |
| 2,6-dibromo-p-benzoquinone-N-chloroimide | | | 5 | | | 10 | | | | | | |
| Cure, °F./minutes: | | | | | | | | | | | | |
| 280°/15′ Tensile, p.s.i. | 1,710 | 1,810 | 1,500 | | 2,140 | 1,570 | | | | | | |
| Elongation, percent | 600 | 500 | 700 | | 530 | 600 | | | | | | |
| 280°/30′ Tensile, p.s.i. | 1,810 | 2,320 | 1,680 | 1,500 | 2,340 | 1,680 | | 1,880 | 240 | 1,110 | 1,960 | 1,180 |
| Elongation, percent | 700 | 560 | 720 | 700 | 500 | 700 | | 530 | 550 | 650 | 550 | 600 |
| 300°/30′ Tensile, p.s.i. | | | | 1,560 | | | 380 | | | | | |
| Elongation, percent | | | | 800 | | | 600 | | | | | |
| 320°/15′ Tensile, p.s.i. | | | | | | | | | | | | |
| Elongation, percent | | | | | | | | | | | | |
| 320°/30′ Tensile, p.s.i. | 1,800 | 2,240 | 1,650 | 1,610 | 2,628 | 1,850 | | 2,180 | 290 | 1,740 | 1,950 | 1,200 |
| Elongation, percent | 700 | 530 | 700 | 700 | 400 | 580 | | 600 | 700 | 600 | 530 | 600 |
| 320°/60′ Tensile, p.s.i. | | | | | | | 400 | 2,170 | 290 | 1,600 | 1,900 | 1,150 |
| Elongation, percent | | | | | | | 550 | 630 | 750 | 600 | 550 | 600 |
| Extracted vulcanizates: [6] | | | | | | | | | | | | |
| 280°/30′ Tensile, p.s.i. | | | | | | | | | | | | |
| Elongation, percent | | | | | | | | | | | | |

[1] Ethylene-propylene copolymer, synthesized with VCl₃-tri-isobutyl aluminum catalyst, 3% toluene-insolubles at R.T., 48.7 mole percent propylene units, 3.14 intrinsic viscosity in tetralin at 125° C.
[2] Ethylene-propylene copolymer, synthesized with VCl₃-tri-isobutyl aluminum catalyst, 23% toluene-insolubles at R.T., 49.5 mole percent propylene units, 3.88 intrinsic viscosity in tetralin at 125° C.
[3] Ethylene-propylene copolymer, synthesized with VCl₃-trihexyl aluminum catalyst, about 30 mole percent propylene units.
[4] Ethylene-propylene copolymer, synthesized with VCl₃-trihexyl aluminum catalyst, 42% toluene-insolubles at R.T., about 30 mole percent propylene units.
[5] A neutral solvent oil of petroleum origin, known in the trade as Flexon 845 (Humble Oil & Refining Company).
[6] Vulcanized samples extracted with a large volume of acetone for 48 hours at room temperature, with several replenishments of fresh acetone, followed by 12 hours of extraction at room temperature with benzene.

The above data demonstrate that the quinone-N-chloroimides are capable of vulcanizing ethylene-propylene copolymers, either in the presence or absence of fillers such as carbon black, and either in the presence or absence of sulfur and/or zinc oxide. The data further show that other metal compounds, e.g., calcium stearate, can be substituted for zinc oxide, and the data show that a range of curing times and temperatures can be employed. The properties shown for the extracted vulcanizates, namely their retention of at least the original values of tensile strength, are further evidence that vulcanizing has actually occurred in these systems.

EXAMPLE 2

The efficacy of the material of this invention on ethylene-propylene rubbers and in blends with various diene-based rubbers is further demonstrated in the following examples.

*Table II*

VULCANIZATION OF BLENDS OF ETHYLENE-PROPYLENE ELASTOMERS AND DIENE-BASED RUBBERS WITH THE COMBINATION OF SULFUR AND 2,6-DICHLORO-p-BENZOQUINONE-N-CHLOROIMIDE

|  | 1 | 2 | 3 | 4 | 5 | 6 | 7 | 8 | 9 | 10 | 11 | 12 |
|---|---|---|---|---|---|---|---|---|---|---|---|---|
| Elastomer [1] | 50 | 50 | 50 | 50 | 50 | 50 | 50 | 50 | 50 | 50 | 50 | 50 |
| Natural rubber (smoked sheet) | 50 | 50 | 50 | 50 |  |  |  |  |  |  |  |  |
| Nitrile rubber (Paracril C) |  |  |  |  | 50 | 50 | 50 | 50 | 50 | 50 | 50 | 50 |
| SBR (GR-S 1500) |  |  |  |  |  |  |  |  |  |  |  |  |
| Neoprene W |  |  |  |  |  |  |  |  |  |  |  |  |
| Butyl 218 |  |  |  |  |  |  |  |  |  |  |  |  |
| HAF black | 50 | 50 | 50 | 50 | 50 | 50 | 50 | 50 | 50 | 50 | 50 | 50 |
| Sulfur | 0 | 1 | 0 | 1 | 0 | 1 | 0 | 1 | 1 | 1 | 1 | 1 |
| Zinc oxide | 0 | 2 | 0 | 2 | 0 | 2 | 0 | 2 | 0 | 2 | 2 | 2 |
| 2,6-dichloro-benzoquinone-N-chloroimide | 0 | 0 | 2 | 2 | 0 | 0 | 4 | 4 | 2 | 2 | 1 | 5 |
| 280° F./30′ Tensile, p.s.i. | 880 | 830 | 1,050 | 1,960 | 380 | 300 | 1,560 | 2,000 | 790 | 1,720 | 1,050 |  |
| Elong., percent | 450 | 550 | 400 | 350 | 930 | 900 | 230 | 230 | 300 | 250 | 430 |  |
| 280° F./60′ Tensile, p.s.i. |  |  |  |  |  |  |  |  |  |  |  | 2,340 |
| Elong., percent |  |  |  |  |  |  |  |  |  |  |  | 130 |
| 320° F./30′ Tensile, p.s.i. | 200 | 590 | 900 | 1,950 | 630 | 650 | 1,660 |  |  |  |  |  |
| Elong., percent | 350 | 480 | 380 | 330 | 850 | 650 | 200 |  |  |  |  |  |
| 335° F./20′ Tensile, p.s.i. |  |  |  |  |  |  |  |  |  |  |  | 1,930 |
| Elong., percent |  |  |  |  |  |  |  |  |  |  |  | 100 |
| 335° F./30′ Tensile, p.s.i. | 270 | 330 | 910 | 1,780 | 380 | 1,430 | 1,860 | 2,070 | 1,190 | 1,850 | 1,810 |  |
| Elong., percent | 450 | 350 | 350 | 330 | 800 | 430 | 250 | 130 | 250 | 150 | 250 |  |

|  | 13 | 14 | 15 | 16 | 17 | 18 | 19 | 20 | 21 | 22 | 23 | 24 |
|---|---|---|---|---|---|---|---|---|---|---|---|---|
| Elastomer [1] | 50 | 50 | 50 | 50 | 50 | 50 | 50 | 50 | 50 | 50 | 50 | 25 |
| Natural rubber (smoked sheet) |  |  |  |  |  |  |  |  |  |  |  |  |
| Nitrile rubber (Paracril C) | 50 | 50 |  |  |  |  |  |  |  |  |  |  |
| SBR (GR-S 1500) |  |  |  | 50 | 50 | 50 | 50 | 50 | 50 | 50 | 50 | 50 |
| Neoprene W |  |  |  |  |  |  |  |  |  |  |  |  |
| Butyl 218 |  |  |  |  |  |  |  |  |  |  |  |  |
| HAF black | 50 | 50 | 50 | 50 | 50 | 50 | 50 | 50 | 50 | 50 | 50 | 50 |
| Sulfur | 1 | 0 | 0 | 1 | 0 | 1 | 0 | 1 | 1 | 1 | 1 | 1 |
| Zinc oxide | 2 | 2 | 0 | 2 | 0 | 0 | 2 | 2 | 2 | 2 | 2 | 2 |
| 2,6-dichloro-benzoquinone-N-chloroimide | 20 | 5 | 0 | 0 | 5 | 5 | 5 | 5 | 7 | 10 | 3 | 2 |
| 280° F./30′ Tensile, p.s.i. | 3,520 |  |  | 240 | 200 | 1,050 | 1,090 | 1,950 | 1,910 | 2,160 | 2,320 | 1,290 | 1,380 |
| Elong., percent | <100 |  |  | 780 | 780 | 380 | 400 | 250 | 230 | 180 | 150 | 280 | 380 |
| 280° F./60′ Tensile, p.s.i. |  | 2,120 |  |  |  |  |  |  |  |  |  |  |
| Elong., percent |  | 150 |  |  |  |  |  |  |  |  |  |  |
| 320° F./30′ Tensile, p.s.i. | 3,520 |  |  | 260 | 290 | 960 | 1,130 | 1,910 | 2,220 | 2,100 | 2,130 | 1,250 | 1,460 |
| Elong., percent | <100 |  |  | 900 | 800 | 400 | 350 | 250 | 200 | 200 | 150 | 250 | 380 |
| 335° F./20′ Tensile, p.s.i. |  | 1,920 |  |  |  |  |  |  |  |  |  |  |
| Elong., percent |  | 130 |  |  |  |  |  |  |  |  |  |  |
| 335° F./30′ Tensile, p.s.i. | 3,550 |  |  | 280 | 620 | 1,000 | 1,320 | 1,730 | 1,870 | 2,210 | 2,240 | 1,610 | 1,680 |
| Elong., percent | <100 |  |  | 750 | 600 | 300 | 300 | 230 | 200 | 200 | 150 | 300 | 320 |

[1] Ethylene-propylene copolymer: 49 mole percent propylene units; intrinsic viscosity 5.2 as measured in decalin at 135° C.

*Table III*

VULCANIZATION OF BLENDS OF ETHYLENE-PROPYLENE ELASTOMERS AND DIENE BASED RUBBERS WITH THE COMBINATION OF SULFUR AND 2,6-p-DICHLORO-BENZOQUINONE-N-CHLORIMIDE

|  | 1 | 2 | 3 | 4 | 5 | 6 | 7 | 8 | 9 | 10 | 11 | 12 | 13 |
|---|---|---|---|---|---|---|---|---|---|---|---|---|---|
| Elastomer [1] | 50 | 50 | 50 | 50 | 50 | 50 | 50 | 50 | 50 | 50 | 50 | 50 | 50 |
| Neoprene W | 50 | 50 | 50 | 50 | 50 | 50 |  |  |  |  |  |  |  |
| Butyl 218 |  |  |  |  |  |  | 50 | 50 | 50 | 50 | 50 | 50 | 50 |
| HAF black | 50 | 50 | 50 | 50 | 50 | 50 | 50 | 50 | 50 | 50 | 50 | 50 | 50 |
| Sulfur | 0 | 1 | 0 | 1 | 1 | 0 | 0 | 1 | 0 | 0 | 1 | 1 | 1 |
| Zinc oxide | 0 | 2 | 0 | 2 | 2 | 2 | 0 | 2 | 0 | 2 | 2 | 2 | 2 |
| 2,6-p-dichloro-benzoquinone-N-chlorimide | 0 | 0 | 2 | 2 | 5 | 5 | 0 | 0 | 5 | 5 | 5 | 7 | 10 |
| Cure, °F./minutes: |  |  |  |  |  |  |  |  |  |  |  |  |  |
| 280°/30′ Tensile, p.s.i. | 730 | 1,400 | 1,110 | 1,730 |  |  | 150 | 150 | 160 |  |  | 1,160 | 1,350 |
| Elongation, percent | 130 | 150 | 280 | 200 |  |  | 680 | 750 | 550 |  |  | 600 | 500 |
| 280°/60′ Tensile, p.s.i. |  |  |  |  | 2,000 | 1,740 |  |  |  | 1,850 | 1,670 |  |  |
| Elongation, percent |  |  |  |  | 150 | 150 |  |  |  | 560 | 530 |  |  |
| 320°/30′ Tensile, p.s.i. | 700 | 1,170 | 1,200 | 1,610 |  |  | 340 | 210 | 180 |  | 1,600 | 1,700 | 2,060 |
| Elongation, percent | 130 | 130 | 280 | 130 |  |  | 700 | 730 | 530 |  | 580 | 480 | 400 |
| 335°/20′ Tensile, p.s.i. |  |  |  |  | 1,580 | 1,950 |  |  |  | 1,530 | 1,820 |  |  |
| Elongation, percent |  |  |  |  | <100 | 200 |  |  |  | 530 | 580 |  |  |
| 335°/30′ Tensile, p.s.i. |  | 1,520 |  | 1,750 |  |  | 330 | 350 | 680 |  |  | 1,480 | 1,670 |
| Elongation, percent |  | 150 |  | 150 |  |  | 750 | 850 | 550 |  |  | 530 | 400 |
| 335°/60′ Tensile, p.s.i. | 870 |  | 1,410 |  |  |  |  |  |  |  |  |  |  |
| Elongation, percent | 150 |  | 250 |  |  |  |  |  |  |  |  |  |  |

[1] Ethylene-propylene copolymer: 49 mole percent propylene units; intrinsic viscosity 5.2 as measured in decalin at 135° C.

Table IV
QUINONE BISCHLORIMIDE VULCANIZATION OF ETHYLENE PROPYLENE ELASTOMER AND ITS BLENDS WITH OTHER RUBBERS

| | | | | | |
|---|---|---|---|---|---|
| Ethylene-propylene elastemer [1] | 100 | 100 | 100 | 100 | 100 |
| HAF carbon black | 50 | 50 | 50 | 50 | 50 |
| Sulfur | 1 | 0 | 1 | 1 | 1 |
| Zinc oxide | 2 | 0 | 2 | 2 | 2 |
| Quinone bischlorimide | 0 | 5 | 2 | 5 | 10 |
| Cure=280° F./30': | | | | | |
| Tensile, p.s.i | 680 | ------ | ------ | 2,360 | ------ |
| Elong., percent | 730 | ------ | ------ | 500 | ------ |
| Cure=320° F./30': | | | | | |
| Tensile, p.s.i | 620 | 850 | 1,270 | 2,500 | 2,380 |
| Elong., percent | 700 | 730 | 580 | 500 | 350 |
| Cure=335° F./60': | | | | | |
| Tensile, p.s.i | 660 | ------ | ------ | 2,440 | ------ |
| Elong., percent | 680 | ------ | ------ | 500 | ------ |

[1] 49 mole percent propylene units; intrinsic viscosity (in decalin at 135° C.) 5.2.

These data show that the vulcanizing agents of this invention are effective not only in ethylene-propylene elastomers, but also in blends of such elastomers with diene-based rubbers, including natural rubber.

As stated previously, the vulcanizing agents of this invention can be employed in blends with other rubbers as well as the elastic copolymers for which they are primarily intended.

The advantages of this invention will be apparent to those skilled in the art. Cured polymer products are provided of improved tensile strength and other physical characteristics in an economic manner. "Pure gum" as well as filled vulcanizates are realizable with these vulcanizing agents, and a wide variety of rates and states of cure can be achieved by employing sulfur and/or zinc oxide or other metallic derivatives along with the quinone-N-chloroimides.

It is to be understood that this invention is not limited to the specific examples which have been offered merely as illustrations, and that modifications may be made without departing from the spirit of the invention.

What is claimed is:

1. A curable composition of matter comprising an elastomeric ethylene-alpha olefin copolymer and a quinone-N-haloimide having the formula:

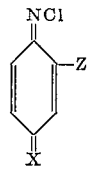

wherein X is selected from the group consisting of O and NCl and Y and Z are selected from the group consisting of H and halogen atoms.

2. The composition of claim 1 in which the copolymer is an ethylene-propylene copolymer.

3. The composition of claim 2 in which the ethylene is present in the copolymer in an amount of from 30 to 90 mole percent.

4. The composition of claim 3 in which the quinone-N-haloimide is utilized in an amount of from about 0.5 to 15 parts by weight per 100 parts of copolymer.

5. The composition of claim 4 in which the quinone-N-haloimide is p-benzoquinone-N-chloroimide.

6. The composition of claim 4 in which the quinone-N-haloimide is 2,6 - dichloro-p-benzoquinone-N-chloroimide.

7. The composition of claim 4 in which the quinone-N-haloimide is 2,6 - dibromo-p-benzoquinone-N-chloroimide.

8. The composition of claim in which the quinone-N-haloimide is p-benzoquinone bischloroimide.

9. The composition of claim 4 in which zinc oxide is also employed.

10. The composition of claim 9 in which sulfur is also empolyed.

References Cited by the Examiner
UNITED STATES PATENTS

| | | | |
|---|---|---|---|
| 2,170,191 | 5/34 | Fisher | 260—396 |
| 2,393,321 | 1/46 | Haworth | 260—85.3 |
| 3,047,552 | 7/62 | Reynolds et al. | 260—88.2 |

JOSEPH L. SCHOFER, *Primary Examiner.*

M. LIEBERMAN, *Examiner.*